Nov. 3, 1953   J. B. ARMITAGE ET AL   2,657,616
MACHINE TOOL TRANSMISSION AND CONTROL MECHANISM
Filed Sept. 15, 1947   6 Sheets-Sheet 1

INVENTOR.
Joseph B. Armitage
James N. Flannery
BY W. D. O'Connor
Attorney

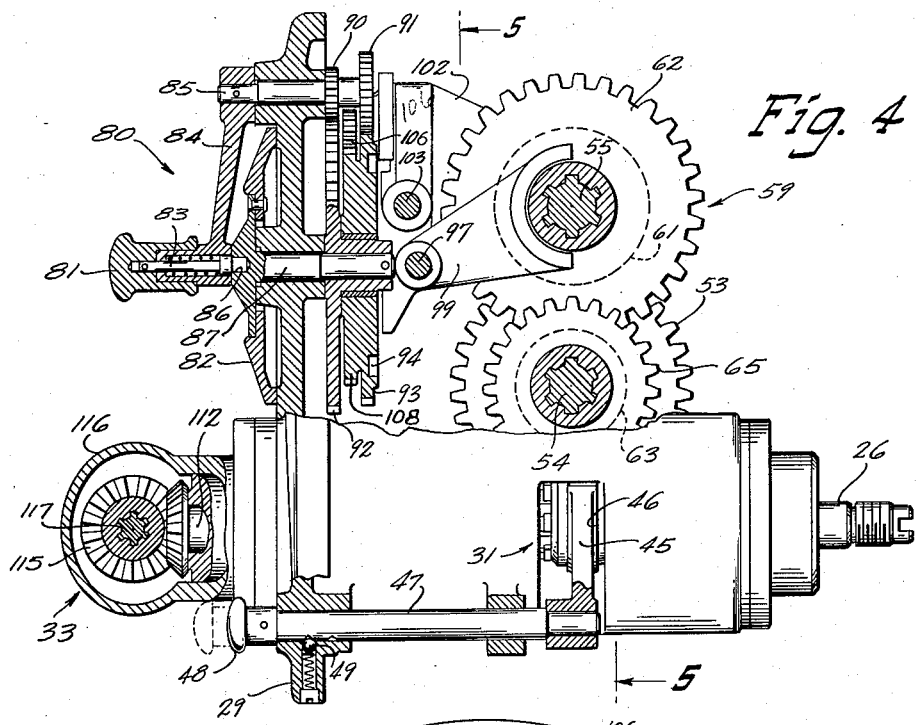

Nov. 3, 1953         J. B. ARMITAGE ET AL         2,657,616
MACHINE TOOL TRANSMISSION AND CONTROL MECHANISM
Filed Sept. 15, 1947                6 Sheets-Sheet 5

INVENTOR.
Joseph B. Armitage
James N. Flannery
BY
W. D. O'Connor
Attorney

Nov. 3, 1953  J. B. ARMITAGE ET AL  2,657,616
MACHINE TOOL TRANSMISSION AND CONTROL MECHANISM
Filed Sept. 15, 1947  6 Sheets-Sheet 6

INVENTOR.
Joseph B. Armitage
James N. Flannery
BY
W. D. O'Connor
Attorney

Patented Nov. 3, 1953

2,657,616

UNITED STATES PATENT OFFICE 2,657,616

MACHINE TOOL TRANSMISSION AND CONTROL MECHANISM

Joseph B. Armitage, Wauwatosa, and James N. Flannery, West Allis, Wis., assignors to Kearney & Trecker Corporation, West Allis, Wis., a corporation of Wisconsin Application September 15, 1947, Serial No. 773,986

3 Claims. (Cl. 90—18)

This invention relates generally to an improvement in machine tools and more particularly to an improved transmission and control mechanism for a milling machine.

The primary object of the invention is to provide an improved machine tool transmission and control mechanism.

Another object of the invention is to provide an improved spindle driving transmission and work feed transmission for a milling machine.

Another object is to provide an improved and simplified machine tool spindle drive train in a transmission wherein the reverser mechanism is mounted directly on the main driving shaft.

Still another object of the invention is to provide an improved spindle speed change mechanism operative on a fixed step transmission.

A further object of the invention is to provide a main driving shaft for a machine tool transmission including a reverser mechanism and a direct power take-off for a secondary feed transmission.

Another object of the invention is to provide an improved transmission drive utilizing a single power source to provide a power drive for a movable member at either feed or rapid traverse rates.

According to this invention, there is provided an improved milling machine of the knee type, in which the power transmission driving a tool retaining spindle and movable work retaining members is greatly simplified. The knee, saddle and table are slidably mounted for movement relative to the column in a well known manner. A motor is enclosed in the base of the column and serves to drive a main driving shaft journalled transversely in the column. The power drive for the spindle transmission and the feed transmission mounted on the movable saddle member is derived from this main driving shaft in the column. A selectively operable reverser mechanism carried on the main drive shaft serves to provide selective reversal of the spindle transmission in the column. An improved speed changing mechanism serves to shift the gears within the spindle transmission, with a single control handle thereon serving to position the gears in each of the speed ranges. A slidable splined shaft carried by the feed transmission on the movable saddle member is connected with a power take-off mechanism driven from the end of the main driving shaft. The single power drive to the transmission constitutes means whereby the movable table member is driven at either feed or rapid traverse rate. A simplified feed changing mechanism operatively associated with the feed transmission readily effects feed rate selection therefrom. A plugging switch operatively connected to the end of the main driving shaft and electrically connected to the drive motor permits the machine operator to brake the spindle and feed transmission to standstill.

The foregoing and other objects of the invention, which will become more fully apparent from the following detailed specification, may be achieved by means of the exemplifying embodiments thereof, depicted in and described in connection with the accompanying drawings, in which:

Fig. 4 is an enlarged sectional view of the spindle control mechanism shown in Fig. 2, depicting the speed changing mechanism and the reverser shifting mechanism;

Fig. 5 is an elevational view of the rear side of the speed box, taken on the plane of line 5—5 in Fig. 4 and showing the cam track and cam drive gears together with the shifter forks;

Figure 1:
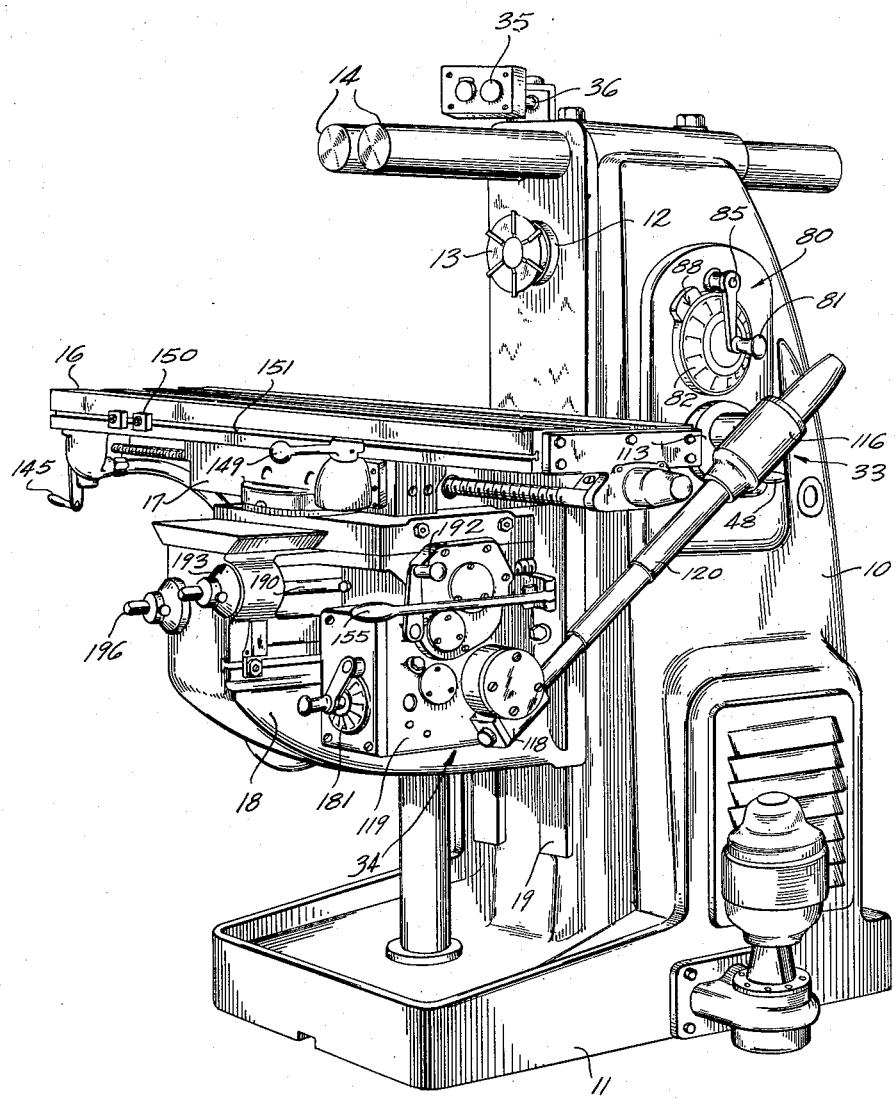
Figure 1 is a perspective view of a knee type milling machine incorporating the transmission and control mechanism exemplifying the invention.
Figure 6:
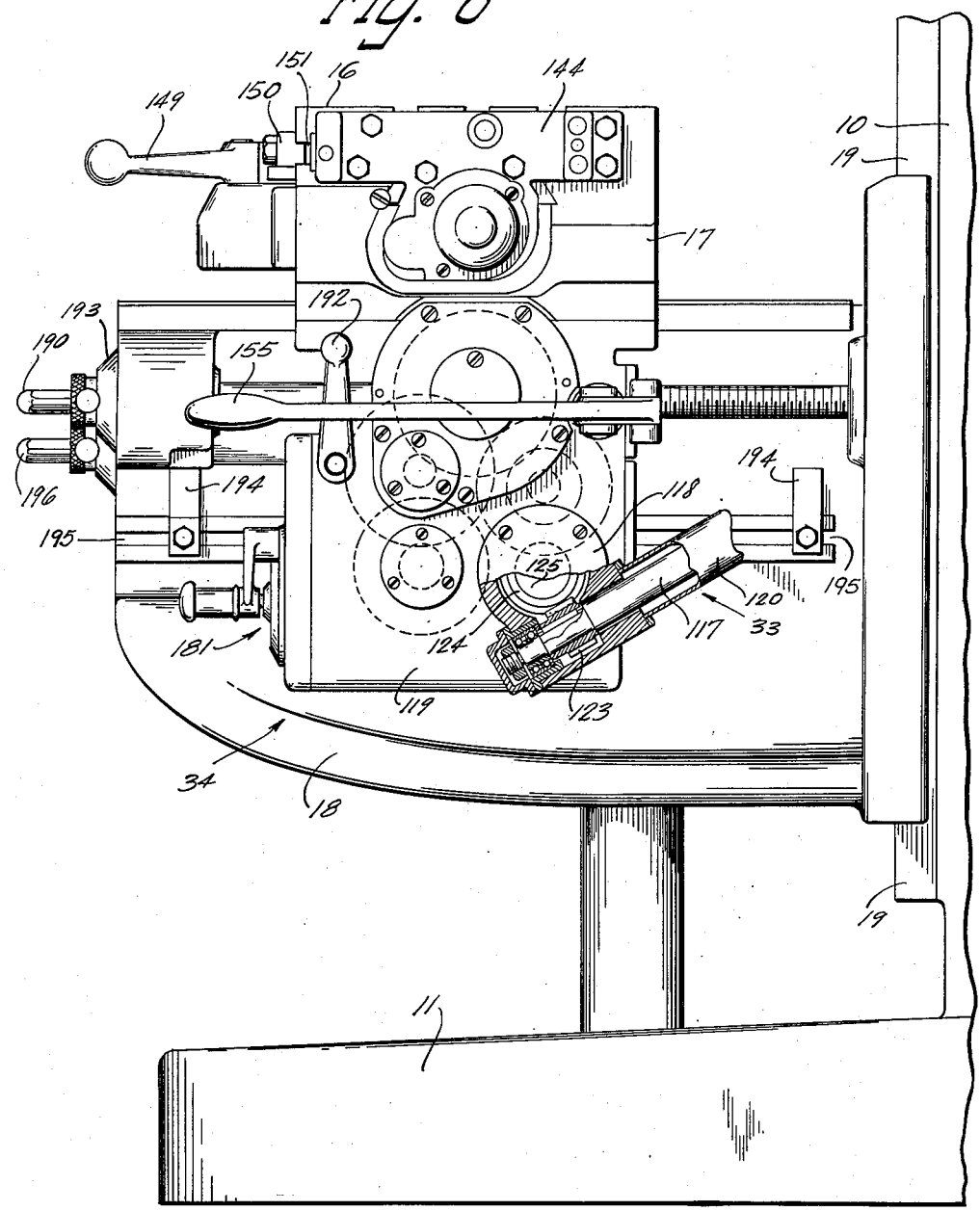
Fig. 6 is a right side elevational view of the knee, saddle and table together with the feed transmission case attached to the side of the saddle, with parts thereof broken away to show the power driving connection from the column.
Figure 7:
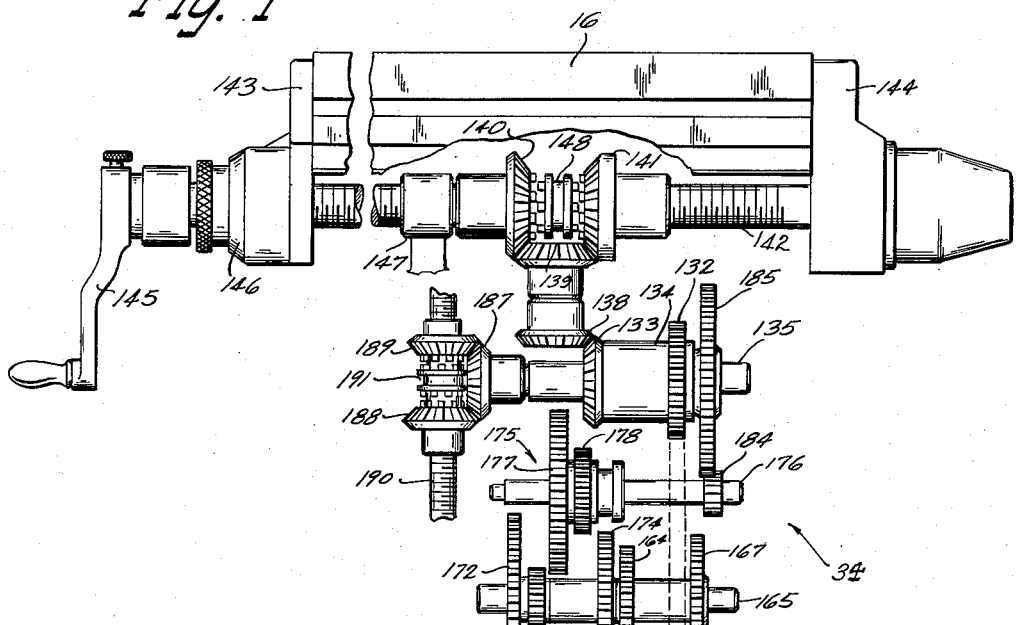
Figure 8:
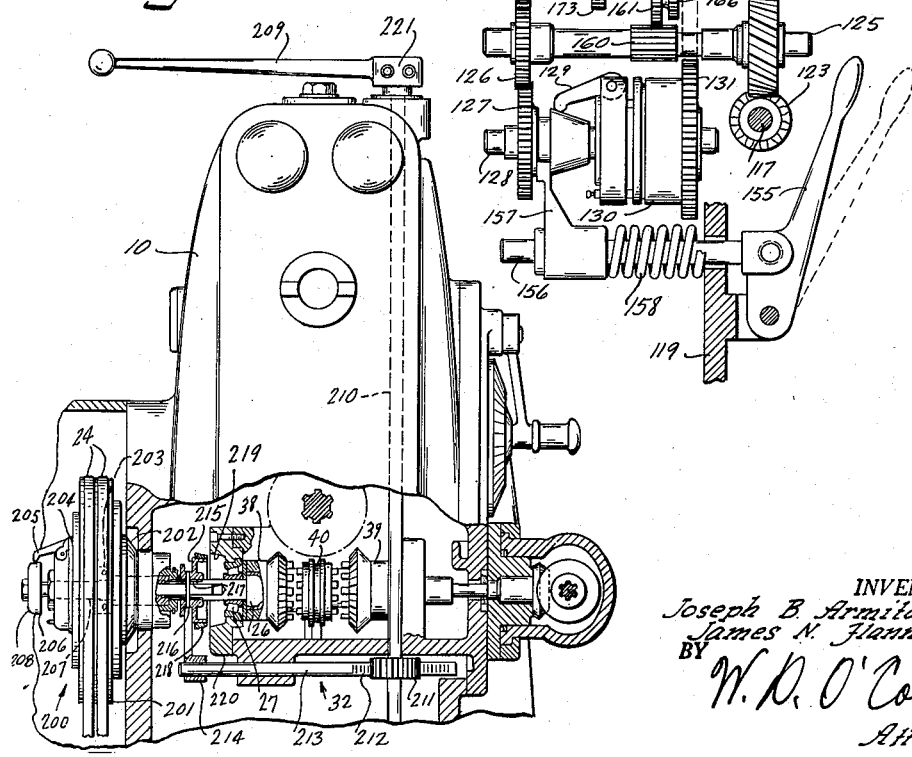

Fig. 7 is a schematic expanded view of the feed and rapid traverse transmission contained within the transmission case shown in Figs. 1 and 6, together with the controls therefor; and Fig. 8 is a detailed view in transverse vertical section of the upper portion of the column, showing a manually operated clutch driving mechanism on the main driving shaft, constituting a modification of the invention.

Referring more particularly to the drawings, the machine there shown as an example of apparatus constituting a preferred embodiment of the invention, is a milling machine of the knee and column, horizontal spindle type. As shown in Fig. 1, the milling machine comprises essentially an upstanding column 10 having a forwardly projecting base 11 integrally formed therewith and constituting a supporting frame for the machine. In the top of the column, a spindle 12 is horizontally journalled to receive a cutter 13 in a well known manner. Two overarms 14, slidably mounted in the column above the spindle, serve to support a cutter carrying arbor (not shown) that may be utilized instead of the cutter 13 in the spindle.

For supporting a workpiece in cooperating relationship with the cutting tool 13 mounted in the rotatably journalled spindle 12, a longitudinally movable work retaining table 16 is carried on a universal-type saddle 17. The saddle 17 is slidably mounted on the top of a vertically movable knee 18 slidably carried on a vertically disposed bearing surface 19 constituting the front face of the column 10. The table, saddle and knee assemblies provide means for positioning a workpiece clamped on the table 16 in any of three transverse planes relative to the cutter 13.

The transmission and control mechanism utilized in this machine is greatly improved and simplified. Many of the parts heretofore used in knee type milling machines have been combined or eliminated and, consequently, an improved milling machine has been provided which incorporates all of the features of the current type milling machines including ready accessibility and serviceability.

Figure 2:
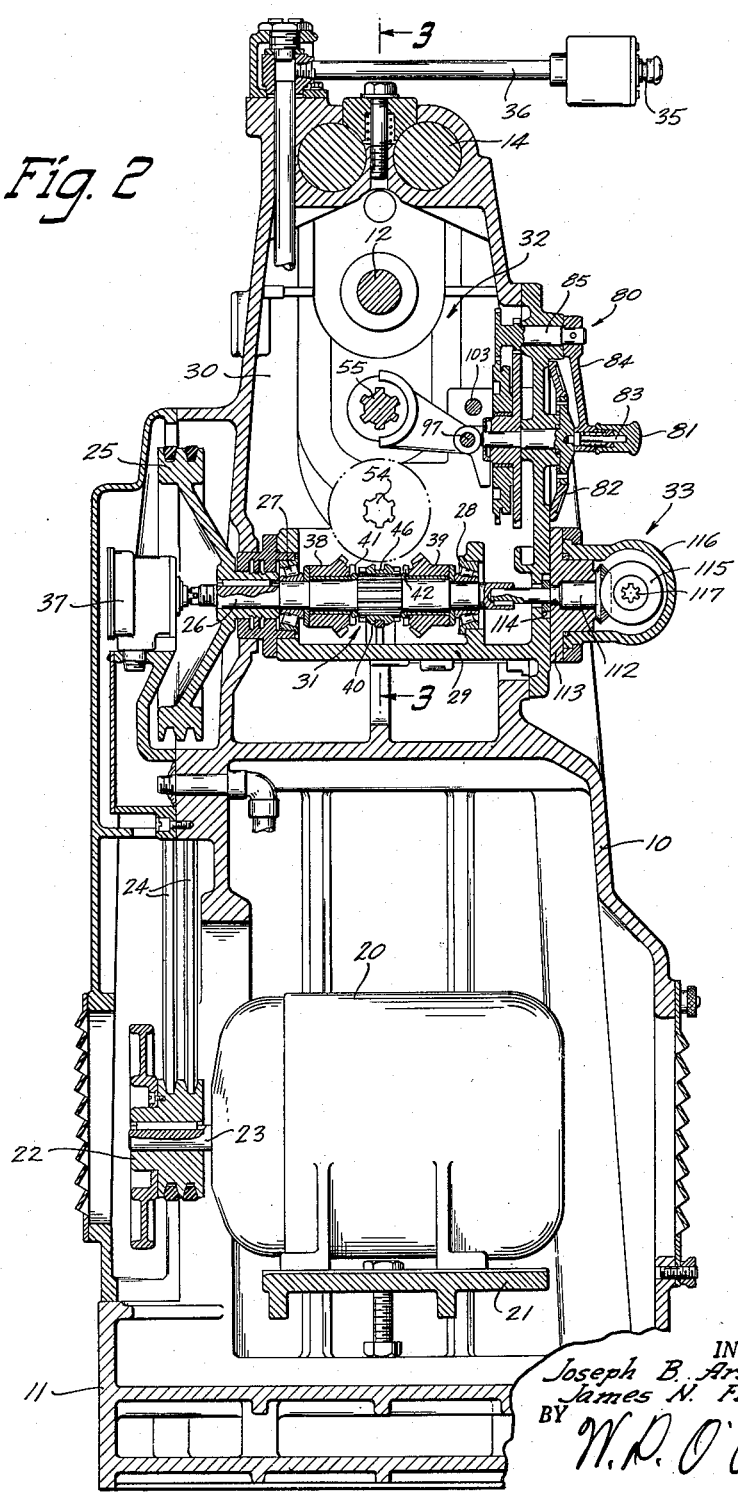
Fig. 2 is a view in transverse vertical section through the machine column, showing the motor and main driving shaft together with the spindle transmission and control mechanism and the take-off gearing to the feed transmission on the end of the main shaft.

Numerous milling operations may be performed upon a workpiece mounted on the table 16 by utilizing any one of a variety of well known cutters operably mounted in the spindle 12. As shown in Fig. 2, power for the machine originates from a motor 20 adjustably mounted on a motor support plate 21 hingedly retained on the base of the column 10. A ventilating fan and pulley assembly 22 keyed on the end of a motor shaft 23 carries a pair of V-belts 24, which serve to drive a pulley 25 keyed to the left end of a main driving shaft 26.

The main driving shaft 26 is journalled transversely of the column 10, with its ends projecting at the respective sides thereof, by means of bearings 27 and 28 mounted in a speed box frame 29. The speed box 29 constitutes a sub-assembled transmission and control mechanism which is removably mounted on the right side of the column, as shown in Fig. 2, with the working elements thereof extending into a transmission cavity 30 formed in the upper portion of the column 10. Thus, when any repairs or adjustments have to be made to the transmission or control mechanism, the entire assembly may be readily removed from the machine.

The pulley 25 is keyed to the left end of the main driving shaft 26, as viewed in Fig. 2, and serves to drive the shaft whenever the motor 20 is energized. A bevel gear reverser mechanism 31, carried on the shaft 26 between the bearings 27 and 28, connects with and drives a fixed-step transmission 32 contained within the column or cavity 30 which, in turn, is connected to drive the tool retaining spindle 12, as will be hereinafter more fully explained. The right end of the main driving shaft 26 is adapted to drive a power take-off mechanism 33 which serves to transmit power to the feed transmission 34 mounted on the saddle 17. Regardless of the position of the saddle 17 and the knee 18, the power from the main driving shaft 26 will be transmitted to the feed transmission 34, which serves to provide a feed drive for effecting power movement selectively of the saddle and table. Thus, the saddle and table assemblies may be power driven at any one of a plurality of feed rates in order to position the workpiece carried on the table 16 relative to the cutter 13 for a particular milling operation, although both the spindle transmission 32 and the feed transmission 34 being driven from the main driving shaft 26.

For controlling the operation of the motor and the spindle and feed transmissions driven therefrom, an electrical control switch 35 is provided. The switch 35 is mounted on the end of a swivel arm 36 movably retained on the top of the column 10, as shown in Figs. 1 and 2. With this arrangement, the switch is readily accessible to the operator regardless of the type of machining operation set up on the machine. The switch is electrically interconnected with the motor 20 contained in the base of the column 10 and with a zero speed plugging switch 37 mechanically driven from the main driving shaft 26, as shown in Fig. 2. The zero speed plugging switch 37 serves to electrically interrupt the energization of the motor 20 upon reversal thereof whenever the operator completely depresses a stop button constituting a portion of the control switch 35. The complete depression of this switch serves to energize a relay (not shown) in the electrical circuit which effects a reversal of current flow in the motor 20 and thereafter the zero speed plugging switch interrupts the current flow when the main driving shaft has been braked to standstill. Appropriate overload relays in the electrical circuit serve to protect the spindle and feed transmissions 31 and 33 whenever an excessive overload occurs while the machine is in operation. With this arrangement, the usual safety clutches are eliminated from the feed transmission and both transmission gear trains driven from the single motor 20 may be readily braked to standstill by the operator; in addition, the transmissions are fully protected against possible damage upon the occurrence of an overload.

Figure 3:
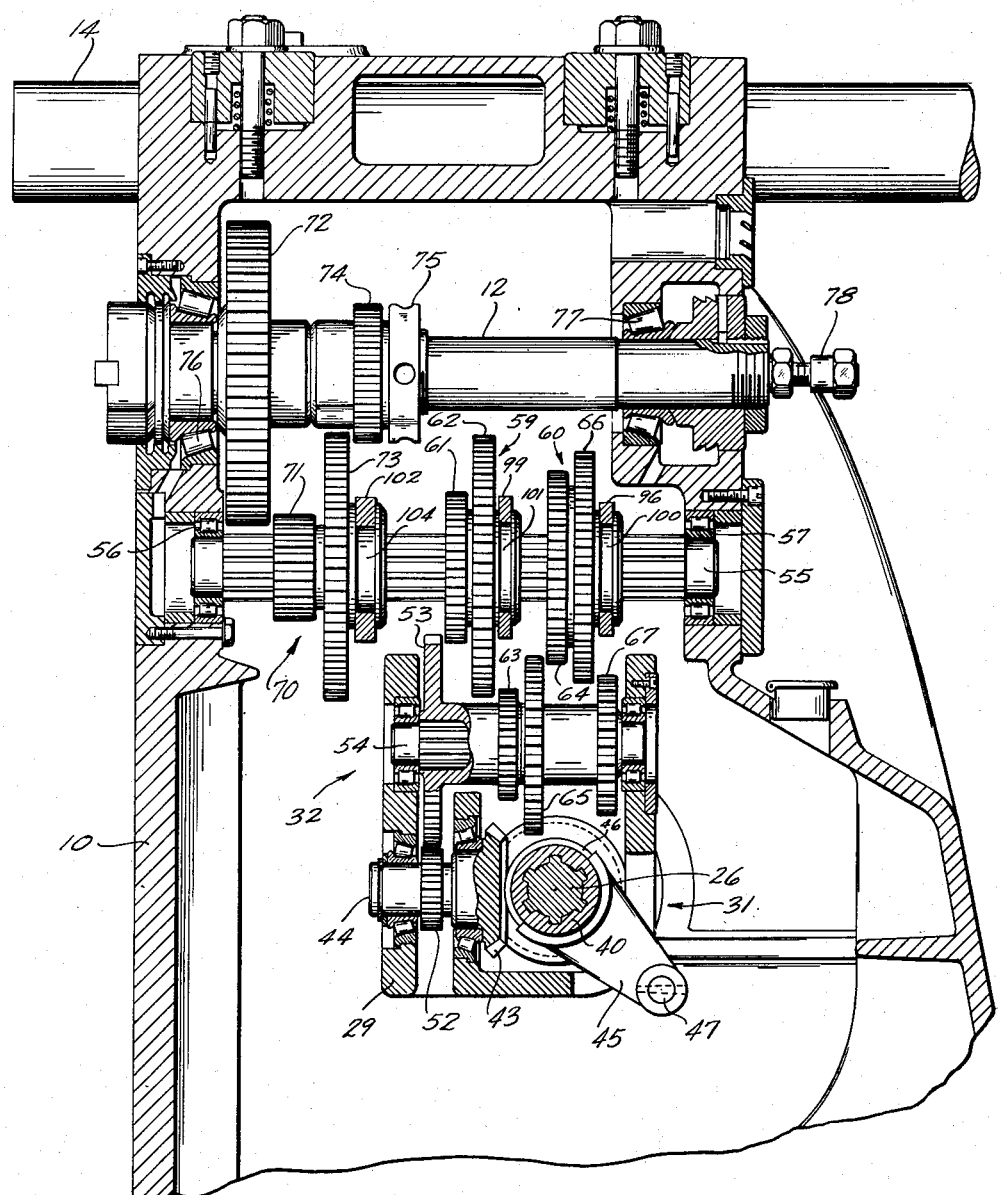
Fig. 3 is a view in longitudinal vertical section through the upper half of the machine column, taken on the plane of the line 3—3 in Fig. 2, and showing the spindle transmission in greater detail.

The reverser mechanism 31, as shown in Figs. 2 and 3, is operably mounted on and driven from the main driving shaft 26 and serves to transmit the driving power through a right angle as well as to provide selective reversal of rotation of the tool retaining spindle 12. The mechanism includes a pair of bevel gears 38 and 39 rotatably mounted on the shaft 26 between the thrust bearings 27 and 28. An axially shiftable clutch element 40 is splined to the shaft 26 and is disposed to be clutched with clutch teeth 41 on the bevel gear 38, or with clutch teeth 42 on the bevel gear 39. When the clutch 40 is in the neutral position shown in Fig. 2, it is disengaged from the bevel gears and, consequently, the spindle transmission 32 is not driven therefrom. Each of the bevel gears 38 and 39 are continuously in mesh with a bevel gear 43 rotatably journalled in the speed box frame 29 and splined to the end of a stub shaft 44.

As shown in Fig. 3, the bevel gear 43 is connected to drive the spindle transmission 32 selectively in either direction at a fixed speed rate. Reversal of the transmission is effected by shifting the clutch sleeve element 40 from the neutral position shown in Fig. 2, into clutching engagement with one of the two bevel gears 38 and 39. This is accomplished by means of a shifter fork 45 shown in Figs. 3, 4 and 5, which engages an annular groove 46 in the clutch sleeve. As shown in Fig. 4, the fork 45 is pinned to the inner end of a reverser rod 47 mounted for axial movement in the speed box frame 29. A knob 48 on the outer end of the rod and disposed on the spindle control panel on the right side of the column 10, serves to facilitate positioning the rod in either one of several positions. With the reverser rod and fork in the inner position shown in Fig. 4, the clutch member 40 is positioned in clutching engagement with the bevel gear 38 and, consequently, the spindle transmission 32 will then be driven from the main driving shaft 26. However, when the knob 48 is pulled outwardly to the dotted position shown in Fig. 4, the shifter fork 45 will serve to move the clutch member 40 out of engagement with the bevel gear 38 and bring it into clutching engagement with the bevel gear 39 to provide a driving train from the main driving shaft 26 to the spindle transmission 32, thereby effecting a reversal in the direction of rotation thereof. A detent mechanism 49 mounted in the frame 29 and operative on the shifter rod 47 functions to retain the rod and fork assembly in a selected position and, consequently, serves to prevent the clutch member from moving out of engagement with either one of the two bevel gears 38 and 39. The location of the reverser mechanism 31 on the main driving shaft 26 serves to provide a direct driving train from the main shaft 26 to the spindle transmission without any intermediate gearing or shafting, as heretofore provided.

The spindle transmission 32 driven from the main driving shaft 26 via the reversing mechanism 31, is of the fixed-step type in which a plurality of axially shiftable gear clusters provides a selection of spindle speeds. A spur gear 52 integrally formed on the shaft 44 continuously meshes with a gear 53 splined to an intermediate shaft 54 rotatably journalled in the speed box frame 29. Thus, the shaft 54 will be driven at a constant speed by the reverser mechanism 31 and the main driving shaft 26. It should be apparent that a simple modification of this structure would include a transmission in which the bevel gear 43 could be mounted directly on the end of the shaft 54.

As clearly shown in Fig. 3, a splined primary transmission shaft 55 is rotatably journalled longitudinally in the upright column member 10 by means of bearings 56 and 57. The shaft 55 is disposed parallel to and directly beneath the spindle 12 and is likewise disposed parallel to the intermediate shaft 54 mounted in the speed box frame 29. Thus, it should be apparent that the speed box frame assembly 29 may be readily removed from the machine without disturbing the rest of the spindle transmission 32.

Two slidable gear couplets 59 and 60 are slidably splined to the primary transmission shaft 55. The couplet 59 includes a gear 61 which may be meshed with the gear 53 on the shaft 54 and a gear 62 which may be meshed with a gear 63 on the shaft 54. The gear couplet may be selectively positioned to mesh either one of the two gears 61 or 62 thereon with their respective mating gears 53 and 63 on the shaft 54, or the couplet may be slid to the neutral position shown in Fig. 3 whereat neither of the two gears are driven from the shaft 54. The gear couplet 60 includes a gear 64 disposed to mesh with a gear 65 on the shaft 54, and a gear 66 which is designed to mesh with a gear 67 splined to the shaft 54. The couplet 60 may be selectively positioned to mesh either one of the gears 64 or 66 thereon with their respective mating gears 65 and 67, or it may be positioned in the neutral position shown in Fig. 3. A control mechanism, hereinafter more fully described, serves to selectively position the gear couplets 59 and 60 so that only one of the gears thereon will be meshed with its respective mating gear and, consequently, the splined shaft 55 carrying the couplets may be driven at any one of four speed rates.

The shaft 55 serves to drive a tertiary or range changer gear couplet mechanism 70 slidably splined thereon. This couplet includes a low speed gear 71 which is designed to mesh with a bull gear 72 carried on the forward end of the tool retaining spindle 12 and a high speed gear 73 which is designed to mesh with a gear 74 keyed to the spindle 12, as shown in Fig. 3. The tertiary gear couplet 70 is likewise selectively positioned by means of the spindle speed control mechanism, and when so positioned in conjunction with the gear couplets 59 and 60, the spindle 12 may be power driven in either direction at any one of eight speed rates. An adjusting collar 75 threadedly retained on the spindle 12 serves to provide means for adjusting the spindle bearings 76 and 77 mounted in the front and rear walls respectively of the column 10. An adjustable draw rod or bar 78 extending through the hollow spindle 12 serves to lock a cutting tool in the spindle in a well known manner.

In order to readily position the three gear couplets 59, 60 and 70 in the spindle transmission 32 and provide a desired spindle speed, an improved spindle transmission control mechanism 80 is utilized. The control mechanism 80 is built into the speed box frame 29 and, consequently, may be readily removed from the column 10 for purposes of repair or adjustment. The control mechanism 80 is of the single handle or knob and single dial type, wherein the operator need only manipulate a single control handle 81, as shown in Figs. 1 and 2, until the desired spindle speed is obtained, as indicated by a rotatable dial 82. The control handle or knob 81 has attached to it a resiliently retained locating plunger 83 carried in the end of a crank 84 pinned to the outer end of a shaft 85. As more clearly shown in Fig. 4, the plunger 83 is normally socketed in a central hole or socket 86 in the outer end of a shaft 87 journalled in the speed box frame 29 and carries the dial 82 bearing speed indicia thereon. As shown in Fig. 1, a pointer 88 on the speed box frame adjacent the dial 82, serves to indicate the speed at which the spindle transmission is set to operate.

Whenever it is necessary to change the spindle speed, the operator withdraws the plunger 83 and rotates the crank 84 until the desired speed is obtained, as indicated by the speed indicia on the dial 82. The rotation of the crank 84 and the shaft 85 effects a corresponding rotation of a pair of gears 90 and 91 keyed to the inner end of the shaft 85, as shown in Fig. 4. The gear 90 meshes with a dial gear 92 pinned to the inner end of the shaft 87 rotatably journalled in the speed box frame 29. Since the shaft 87 carries the speed indicating dial 82, the rotation of the crank 84 serves to effect a corresponding rotation of the dial 82 at reduced rate. At the same time, the gear 91 is meshed with and drives a cam gear 93 rotatably journalled on the extending hub of the dial gear 92. As shown in Figs. 4 and 5, the cam gear 93 has a cam groove 94 integrally formed in the side face thereof; the groove 94 being designed to receive a contact knob or follower 95 attached to a shifter fork 96 carried on a slide bar 97, as shown in Fig. 5. The cam groove also engages with a knob or follower 98 attached to a shifter fork 99, slidably mounted on the slide bar 97.

The shifter fork 96 is retained in a clutch groove 100 on the gear couplet 60, while the shifter fork 99 is retained in a clutch groove 101 in the gear couplet 59. The contour of the cam track or groove 94 is such that the forks operated therefrom will serve to position the gear couplets 59 and 60 in the spindle transmission and retain the couplets in position after a speed selection has been made through an adjustment of the control mechanism 80. The cam track is so shaped that one of the two gear couplets 59 or 60 is retained in a neutral position, while the other is disposed to provide meshing engagement between one of the gears thereon with its corresponding mating gear on the intermediate shaft 54. Thus, it is impossible to have both of the gear couplets 59 and 60 in engagement at the same time.

The tertiary or range change gear couplet 70 is adjustably positioned through the operation of a range change shifter fork 102, as shown in Fig. 5, slidably mounted on a slide bar 103. The fork 102 is disposed to fit into a clutch groove 104. A crank pin 105 embedded in the side of the shifter fork 102 engages a socket in the side of a gear 106 rotatably journalled on a stub shaft 107. The gear 106 is driven from a secondary gear 108 integrally formed with the cam gear 93. Thus, whenever the control mechanism crank 84 is rotated to effect the transmission speed change, the gear 106 is driven simultaneously to operate the range change shifter fork 102 and effectively position the range change couplet 70. It is apparent that the control mechanism 80 affords a simple means for positioning and retaining the three gear couplets 59, 60 and 70 in the spindle transmission 32 in order to provide spindle operation at any one of the available spindle speed ratios provided therefor.

The power take-off mechanism 33 connecting with the extending end of the main driving shaft 26, as shown in Figs. 2 and 4, serves to transmit power from the motor 20 in the base of the column 10 to the feed transmission 34 carried on the right side of the saddle 17. The take-off mechanism 33 includes a stub shaft and bevel gear 112, which is rotatably journalled in a take-off bracket 113 bolted to the outer face of the speed box frame 29. The inner end of the stub shaft 112 is keyed to fit into the end of the main driving shaft 26. A small gear 114 keyed to the shaft 112 constitutes part of an oil pump which serves to provide lubrication of the various moving parts within the spindle transmission cavity 30. The bevel gear formed on the end of the shaft 112 is disposed to mesh with a bevel gear 115 rotatably mounted in a cover member 116, as shown in Figs. 1, 2 and 4. The bevel gear 115 is splined internally to receive a splined shaft 117.

The lower end of the shaft 117 is rotatably retained in a power input bracket 118, as shown in Figs. 1 and 6. The bracket 118 is swivelably mounted on the side of a transmission case 119 bolted on the saddle 17 and containing the feed transmission 34. The shaft 117 transmits power to the transmission for driving the table and saddle members 16 and 17. Since the output bracket cover member 116 and the input bracket 118 are both swivelably mounted on their respective supporting members, the power drive to the feed transmission 34 will be maintained regardless of the position of the saddle and knee members 17 and 18. The splined connection between the bevel gear 115 and the shaft 117 permits axial movement between the members and, consequently, provides a means of compensation for the variance in distance between the power output bracket and the power input bracket 118 for various adjusted positions of the saddle 17 and the knee 18. A telescopic tube 120 anchored at each end in the output cover member 116 and the input bracket member 118, respectively, serves to provide a guard for the rotating shaft 117 contained therein regardless of the adjusted position of the saddle 17 and the knee 18.

A helical gear 123 keyed to the end of the shaft 117 and contained within the power input bracket 118 meshes with and drives a helical gear 124 keyed to the end of a shaft 125 horizontally disposed within the transmission case 119, as shown in Figs. 6 and 7. Power transmitted to the shaft 125 is utilized to provide a power drive for effecting movement of the table 16 and saddle 17 at a selected feed rate, and to provide power for driving the table 16 at rapid traverse rate.

The rapid traverse drive includes a drive gear 126 driven by the shaft 125 and meshing with a gear 127 rotatably journalled on a shaft 128 and constituting a part of a selectively operable rapid traverse clutch mechanism 129. The clutch 129 is disposed to drive a driven gear 131 carried on the shaft 128, with the gear 131 meshing with a gear 132, as indicated by the dotted lines shown in Fig. 7; while the gear 132 is connected to drive a bevel gear 133 through an overrunning clutch 134 operably mounted on a shaft 135. The overrunning clutch 134 serves to permit a power drive transmission to be completed to effect power movement of the table 16 at rapid traverse rate.

The bevel gear 133 is meshed with a bevel gear 138 vertically disposed in the saddle 17 and integrally formed with a second bevel gear 139 constantly meshing with a pair of reversing gears 140 and 141 rotatably mounted on a table screw shaft 142. The ends of the table screw shaft 142 are rotatably journalled in end brackets 143 and 144 bolted to the ends of the table 16. As shown in Figs. 1 and 7, a crank handle 145 operably retained on the left end of the table screw 142 affords a means for manually moving the table 16, while a dial 146 fastened to the screw shaft 142, as shown in Fig. 7, affords a means for determining the extent of table movement. The rotation of the table screw 142 in a nut 147 fixedly carried in the saddle 17 effects axial movement of the table and screw assembly in a well known manner.

The reversing gears 140 and 141 together with a cooperating clutch element 148 constitute a reverser mechanism which permits the table 16 to be power driven in either direction. The clutch element 148 is slidably keyed to the table screw 142 and is disposed between the gears 140 and 141. When the clutch element 148 is neutrally disposed, as shown in Fig. 7, neither of the gears are clutched thereto to transmit power to the table screw 142. However, when the clutch element is shifted rightwardly or leftwardly from the position shown, it will engage either the gear 141 or 140, respectively, to connect the engaged gear with the table screw 142 and, consequently, effect rightwardly or leftwardly movement, respectively, of the table 16. The position of the clutch element 148 is determined by the position of a control handle 149 operably disposed on the front of the saddle 17, as shown in Figs. 1 and 6.

By manually shifting the handle to one of three positions, the power movement of the table may be directionally controlled, or it may be stopped altogether. Trip dogs 150 adjustably positionable in a T-slot 151 are disposed to engage the control handle 149, in a well known manner, at a predetermined point of table travel and trip the handle 149 and the clutch element 148 connected thereto to a neutral position whereat table movement is stopped.

The rapid traverse clutch 129 controlling the power operation of the table 16 at rapid traverse rate is selectively operated by means of a manually actuated rapid traverse lever 155 mounted on the side of the transmission case 119, as shown in Figs. 1, 6 and 7. The lever 155 is pinned to the end of a shifter rod 156 upon which a shifter fork 157 is fixedly mounted. Normally, a spring 158 disposed to abut the fork 157 and the transmission wall 119, as shown in Fig. 7, serves to resiliently retain the handle, rod and fork assembly in a position whereat the rapid traverse clutch 129 is disengaged. However, when the handle 155 is manually moved to the dotted position shown in Fig. 7, the shifter fork will move the gear and cone element 127 axially on the shaft 128 until the clutch 129 is engaged to transmit power from the shaft 125 to the rapid traverse transmission connecting with the table screw 142. As long as the rapid traverse lever 155 is retained in this position, the clutch 129 will remain engaged to effect movement of the table 16 at rapid traverse rate in the direction dependent upon the position of the aforedescribed clutch element 148. When the lever 155 is released, the spring 158 will serve to effect disengagement of the rapid traverse clutch 129.

Power for driving the table 16 and the saddle 17 at one of a plurality of feed rates is also obtained via the shaft 125. A gear 160 integrally formed on the shaft 125 meshes with a gear 161 constituting a part of a slidable gear couplet 162 splined to a shaft 163. The gear couplet 162 may be selectively positioned to mesh the gear 161 with a gear 164 on an intermediate shaft 165, or the gear couplet 162 may be axially shifted to mesh a gear 166 thereon with a gear 167 keyed to the shaft 165. Thus, with the gear couplet 162 positioned in either of the two aforementioned positions, the shaft 165 will be driven at one of two speeds. A second gear couplet 170 is provided to drive the intermediate shaft 165 at two additional speed rates. When the gear couplet 170 is being used to drive the shaft 165, the gear couplet 162 must remain positioned in the central position shown in Fig. 7 whereat the gears thereon are out of mesh with gears 164 and 167 on the shaft 165. When thus positioned, a gear 171 on the couplet 170 may be meshed with a gear 172 on the shaft 165, or a gear 173, constituting a part of the couplet 170, may be meshed with a gear 174 on the shaft 165. The gear couplet 170 is maintained in a neutral position whenever the gear couplet 162 is positioned to effect a power drive therefrom directly to either of the gears 164 or 167 on the shaft 165. With this arrangement, the intermediate shaft 165 may be driven selectively at one of four speeds.

A tertiary gear couplet 175 slidably splined to a shaft 176, is constituted of two gears 177 and 178. When the gear 177 is disposed to mesh with a gear 179 keyed to the shaft 165, the shaft 176 will be driven in the lower speed ranges, whereas when the gear 178 is meshed with a gear 174 keyed to the shaft 165, the shaft 176 will be driven in the high speed range. When the couplet 175 is retained in the intermediate position shown in Fig. 7, both of the gears 177 and 178 thereon are out of mesh with the gears on the shaft 165 and, consequently, the feed train will be interrupted at this point. Thus, the shaft 176 may be driven at any one of eight speed rates and, consequently, the table 16 and the saddle 17 will be driven selectively at one of eight feed rates.

A feed change control mechanism 181, similar in structure to the spindle transmission control mechanism 80 aforedescribed, is utilized to shift the gear couplets 162, 170 and 175. The feed change mechanism is designed so that only one of the gear couplets 162 or 170 will be disposed to drive one of the gears on the intermediate shaft 165 for a selected feed rate setting. The feed rate control mechanism 181 is readily operable by the machine operator from the front of the machine and is fixedly mounted in the transmission case 119 with the aforedescribed combinations of gear settings in the feed transmission. The operator may readily manipulate the feed control mechanism 181 to position the gear couplets therein and selectively drive the table 16 or the saddle 17 at any one of the eight feed rates.

The transmission train from the feed transmission 34 to the table screw 142 is completed by a pair of gears 184 and 185. The gear 184 keyed to the shaft 176 meshes with the gear 185 keyed to the shaft 135. Normally, when the feed transmission is operating to drive the table 16 at feed rate, the overrunning clutch 134 will operate to transmit the power from the shaft 135 to the bevel gears 133 and 138 and thence to the table screw 142, as aforedescribed. However, when the rapid traverse transmission is energized to drive the table 16 at rapid traverse rate, the overrunning clutch 134 will serve to overrun the feed rate drive and permit movement of the table 16 at rapid traverse rate without straining any part of the feed transmission 34.

The saddle 17 may be power driven at feed rate with the schematic arrangement shown in Fig. 7. Although it is to be understood that the saddle 17 could also be readily driven at rapid traverse rate by making appropriate changes in the arrangement of the transmission. For driving the saddle 17, a bevel gear 187 fixedly carried on the end of the shaft 135, is disposed to mesh with a pair of reversing gears 188 and 189 rotatably journalled on a saddle screw shaft 190. A tooth clutch 191 slidably keyed to the saddle screw 190 intermediate the reversing gears 188 and 189 affords a means of effecting selective power movement of the saddle 17 in either direction. The clutch 191 may be axially shifted in either direction from the neutral position shown in Fig. 7 to provide power movement of the saddle away from or toward the machine column 10 and, consequently, serves to provide transverse movement of the table 16 slidably carried by the saddle.

A shifter lever 192, shown in Figs. 1 and 6, mounted on the side of the feed transmission case 119, affords a means for selectively positioning the clutch element 191 by means of interconnecting linkage mechanism (not shown). When the shifter lever 192 is positioned to retain the clutch element 191 in the neutral position, the power connection to the feed transmission is disconnected. However, when the lever 192 is shifted leftwardly from the position shown in Fig. 6, the clutch 191 is moved into clutching engagement with the gear 188 to effect power movement of the column 10 away from the face of the column 10. When the shifter lever 192 is moved rightwardly from the neutral position shown in Fig. 6, the clutch 191 is brought into engagement with the clutch teeth on the gear 189 to effect power movement of the saddle 17 toward the column 10. As shown in Figs. 1 and 6, the outer extending end of the saddle screw shaft 190 is squared to readily receive a crank (not shown) in a well known manner whereby manual movement of the saddle 17 may be effected by rotating the screw shaft 190 directly. A dial 193 is adjustably retained on the end of the saddle screw shaft 190 and permits the operator to make precise adjustments in positioning the saddle on the face of the knee 18. Stop dogs 194 adjustably mounted in a T-slot 195 in the side of the knee 18 are operative upon a trip mechanism (not shown) which serves to shift the clutch element 191 to the neutral position. These stop dogs may be positioned predeterminately to limit the travel of the saddle 17 in either direction.

On the machine herein described, manual means are provided for elevating the knee assembly 18. To this end, a crank (not shown) may be applied to the extending squared end of a shaft 196 which connects with and drives an elevating screw (not shown) in a well known manner. While manual elevation of the knee is herein provided for, it is to be understood that the feed transmission 34 could be readily adapted to provide a power feed or rapid traverse drive for effectively raising or lowering the knee assembly 18.

The aforedescribed machine constitutes the complete milling machine of the knee type, utilizing a transverse driving shaft in the column for driving the spindle transmission and the table and saddle feed transmission. A modified version of the same machine is shown in Fig. 8 and includes a main driving shaft 26 driven through a manually actuated clutch mechanism 200. The V-belts 24, driven by the motor 20 in the base of the column 10, drive a pulley 201 rotatably journalled in a pulley bracket 202 bolted to the left side of the column 10, as shown in Fig. 8. The pulley 201 is concentrically disposed relative to the main driving shaft 26 transversely journalled in the column 10, as aforedescribed. A bearing 203 mounted in the pulley 201, serves to support the left end of the main driving shaft. A clutch pressure plate assembly 204 having a set of three clutch fingers 205, serves to lock the freely rotating pulley 201 to the shaft 26 and provide a drive for the two transmissions in the machine tool.

A clutch cone 206 bolted to the outer end of an actuating rod 207 is provided with an annular surface 208 upon which the clutch fingers 205 operate in a well known manner. With the cone 206 in the position shown in Fig. 8, the clutch fingers 205 are in their extended position whereat the pressure plate assembly 204 is engaged to effect the driving connection between the pulley 201 and the main driving shaft 26. However, when the cone 206 is shifted rightwardly from the position shown in Fig. 8, the pressure on the fingers 205 is released and, consequently, the clutch is disengaged. The actuating rod 207 is selectively operated by the machine operator through the manual operation of a starting lever 209 pivotally mounted on the top of the column 10. By manipulating the starting lever 209, the operator effects rotation of a shaft 210 vertically disposed in the column 10.

Rotation of the shaft 210 effects similar rotation of a pinion gear 211 pinned to the lower end of the shaft. The teeth on the pinion 211 mesh with teeth 212 on a rack bar 213. A shifter fork 214 is fixedly retained on the end of the rack bar 213. The fork 214 is disposed to engage an annular yoke member 215 slidably mounted on the main driving shaft for axial movement thereon. A pin 216 fixedly retained in the yoke member extends diametrically through the main driving shaft 26 and the actuating rod 207. An axial slot 217 in the main driving shaft 26 permits the yoke member 215 to be moved unitarily with the actuating rod 207. Consequently, counterclockwise rotation of the starting lever 209 and shaft 210 from the neutral position effects leftwardly movement of the rack 213 and shifter fork 214 which, in turn, shifts the yoke 215, the actuating rod 207, and the clutch cone 206 leftwardly to engage the clutch mechanism 200. The operator need only actuate the starting lever 209 in the opposite direction in order to shift the cone 206 to a position whereat the pressure on the clutch fingers 205 is relieved and the clutch is disengaged. If the operator needs to brake the main driving shaft 26 to stop it quickly in a particular instance, he need only actuate the starting lever 209 clockwise in order to effect movement of the yoke member 215 rightwardly to bring an annular brake band 218 into engagement with a conical recess 219 in a bearing cap 220 supporting the main driving shaft bearing 27. When the brake band 218 on the yoke member 215 is thus engaged with the stationary bearing cap, the rotating shaft 26 and all of the spindle and feed transmission mechanisms driven therefrom are immediately braked to standstill. With the modified version aforedescribed, the reversing gears 38 and 39 constituting a part of the reverser mechanism 31 are retained in the previously described position with the clutch 40 disposed between them on the main driving shaft 26. The spindle speed transmission 32 and the feed transmission 34 driven from the main driving shaft 26 are not altered with the introduction of the clutch mechanism 20.

A switch box 221 integrally formed in the starting lever 209 contains an electrical switch for controlling the operation of the motor 20 in the base of the column 10. With the wires to the switch box 221 enclosed in the hollow shaft 210, the wires therein are fully protected from any oil or grease. In order to facilitate the positioning of the starting lever 209 and to make it readily accessible to the machine operator for each machining operation set up on the machine, the starting lever 209 and the shaft 210 attached thereto may be raised to disengage the pinion gear 211 and the rack teeth 212 and permit selective positioning of the lever 209. Thereafter, the downward pressure exerted on the starting lever 209 will bring the pinion gear 211 back into operating position relative to the rack.

The machine tool herein described is a knee type milling machine in which a single drive motor is utilized to drive a spindle transmission and a feed transmission housed in a movable member. A main driving shaft journalled in the column has a reverser mechanism directly operative therefrom which is used to effect reversal of the tool-retaining spindle. A simplified speed control mechanism serves to effect selective control of the output speed of the spindle transmission. An improved feed transmission operatively connected to the main driving shaft provides for the power operation of the saddle and table at a plurality of feed rates. With the reverser mechanism located on the main driving shaft, the spindle transmission may be readily reversed to change the direction of rotation of the tool spindle without affecting the feed transmission or the direction of movement of the table and saddle driven therefrom. The machine tool arrangement herein described, serves to simplify the machine to a considerable extent and to eliminate many of the movable parts generally incorporated in a conventional type machine. The machine enjoys particular utility in the production line wherein a simplified readily operable machine is particularly desirable.

From the foregoing detailed description of the illustrative structure set forth herein to disclose the teachings of the invention, it is apparent that there has been provided an improved milling machine of the production type in which a single motor is used to drive the speed and feed transmissions of the machine.

Although the invention has been described in considerable detail in order to fully disclose the invention and its application, it is to be understood that the particular apparatus shown and described is intended to be illustrative only and that the various novel features of the invention may be incorporated in other structural forms without departing from the spirit and scope of the invention as described in the subjoined claims.

The principles of the invention having now been fully explained in the foregoing description of embodying apparatus, we hereby claim as our invention:

1. In a speed adjusting and indicating mechanism for a variable speed power transmission apparatus, a rotatably mounted speed indicating dial, a speed adjusting crank having an actuating handle, said crank being rotatably mounted adjacent to said dial and operatively connected to turn said dial at reduced speed, and latching means arranged to latch said crank with its handle concentric with said dial.

2. In a speed changing and indicating apparatus, a variable speed power transmission mechanism, a rotatably mounted speed adjusting crank having an actuating handle, said crank being operatively connected to effect a speed changing adjustment of said transmission mechanism upon being turned through a full revolution, a speed indicating dial rotatably mounted beside said crank and operatively connected thereto in manner to be turned thereby at reduced speed for indicating the speed adjustment of said mechanism, and latching means arranged to latch said crank in adjusting position with its actuating handle disposed concentrically of said dial.

3. In a milling machine comprising a column and a cutter spindle rotatably mounted in said column, a variable speed transmission mechanism operatively connected to drive said spindle at selected speed, a speed indicating dial rotatably mounted on said column and operatively connected to indicate the speed setting of said transmission mechanism, a transmission mechanism adjusting crank handle journalled in said column adjacent to said speed indicating dial and operatively connected to adjust said transmission mechanism upon rotation through a full revolution, and latching means arranged to latch said crank in adjusted position with its handle concentric with said dial.

JOSEPH B. ARMITAGE.
JAMES N. FLANNERY.

References Cited in the file of this patent

UNITED STATES PATENTS

| Number | Name | Date |
| --- | --- | --- |
| 1,710,913 | Armitage | Apr. 30, 1929 |
| 1,985,688 | Parsons | Dec. 25, 1934 |
| 2,012,672 | Parsons | Aug. 27, 1935 |
| 2,070,808 | Romaine et al. | Feb. 16, 1937 |
| 2,085,888 | Armitage | July 6, 1937 |
| 2,204,693 | Parsons | June 18, 1940 |
| 2,240,973 | Armitage | May 6, 1941 |
| 2,273,956 | Hall | Feb. 24, 1942 |
| 2,382,934 | Armitage | Aug. 14, 1945 |
| 2,436,583 | Lear | Feb. 24, 1948 |